United States Patent
Liu et al.

(10) Patent No.: US 11,212,891 B2
(45) Date of Patent: Dec. 28, 2021

(54) LIGHT TUBE APPARATUS

(71) Applicant: XIAMEN ECO LIGHTING CO. LTD., Xiamen (CN)

(72) Inventors: Qi Liu, Xiamen (CN); Qiyuan Wang, Xiamen (CN); Yongjun Bao, Xiamen (CN)

(73) Assignee: XIAMEN ECO LIGHTING CO. LTD., Fujian (CN)

( * ) Notice: Subject to any disclaimer, the term of this patent is extended or adjusted under 35 U.S.C. 154(b) by 0 days.

(21) Appl. No.: 16/852,463

(22) Filed: Apr. 18, 2020

(65) Prior Publication Data
US 2021/0329759 A1 Oct. 21, 2021

(51) Int. Cl.
| | |
|---|---|
| *H05B 45/325* | (2020.01) |
| *H05B 45/14* | (2020.01) |
| *H05B 45/54* | (2020.01) |
| *H05B 45/37* | (2020.01) |
| *H05B 45/36* | (2020.01) |

(52) U.S. Cl.
CPC .......... *H05B 45/325* (2020.01); *H05B 45/14* (2020.01); *H05B 45/36* (2020.01); *H05B 45/37* (2020.01); *H05B 45/54* (2020.01)

(58) Field of Classification Search
CPC .......... H01J 65/048; H01J 61/56; H01J 61/28; H01J 5/54; H01J 7/20; H01J 7/22; H01J 9/247; H01J 9/323; H01J 9/34; H01J 9/395; H01J 9/40; H01J 61/523; H01J 61/20; H01J 61/24; H01J 61/35; H01J 61/44; H01J 61/46; H01J 61/72; H01J 65/042; H01J 1/52; H01J 61/545; H01J 61/547; H05B 41/2806; H05B 41/3921; H05B 41/38; H05B 41/3924; H05B 41/3927; H05B 31/50; H05B 45/37; H05B 45/3725; H05B 45/50; H05B 41/382; H05B 45/20; H05B 47/16; H05B 47/175; Y02B 20/00; Y02B 20/22; Y02B 20/19; Y02B 70/10; Y02B 70/123; Y02B 20/30
See application file for complete search history.

(56) References Cited

U.S. PATENT DOCUMENTS

2017/0358441 A1* 12/2017 Nanchung .................. H01J 9/34
2019/0098725 A1* 3/2019 Sadwick ............... H05B 47/175

* cited by examiner

*Primary Examiner* — Monica C King
(74) *Attorney, Agent, or Firm* — Chun-Ming Shih; Lanway IPR Services

(57) ABSTRACT

A light tube apparatus includes a tubular housing, a LED module, an EMI circuit, a rectifier circuit, a filter circuit, a conversion circuit, a safety circuit and a PWM modulation circuit. The safety circuit is connected to a dimming signal from a dimmer for preventing an incorrect connection when the dimmer is connected in wrong direction causing loop breakage. The PWM modulation circuit is connected to the conversion circuit and the safety circuit for performing a pulse width modulation for the dimming signal supplied to the conversion circuit for adjusting a luminance level of the LED module.

19 Claims, 6 Drawing Sheets

LIGHT TUBE APPARATUS

FIELD

The present application is related to a light tube apparatus and more particularly related to a light tube apparatus with safety design.

BACKGROUND

Electroluminescence, an optical and electrical phenomenon, was discover in 1907. Electroluminescence refers the process when a material emits light when a passage of an electric field or current occurs. LED stands for light-emitting diode. The very first LED was reported being created in 1927 by a Russian inventor. During decades' development, the first practical LED was found in 1961, and was issued patent by the U.S. patent office in 1962. In the second half of 1962, the first commercial LED product emitting low-intensity infrared light was introduced. The first visible-spectrum LED, which limited to red, was then developed in 1962.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

With high light output, LEDs are available across the visible, infrared wavelengths, and ultraviolet lighting fixtures. Recently, there is a high-output white light LED. And this kind of high-output white light LEDs are suitable for room and outdoor area lighting. Having led to new displays and sensors, LEDs are now be used in advertising, traffic signals, medical devices, camera flashes, lighted wallpaper, aviation lighting, horticultural grow lights, and automotive headlamps. Also, they are used in cellphones to show messages.

A Fluorescent lamp refers to a gas-discharge lamps. The invention of fluorescent lamps, which are also called fluorescent tubes, can be traced back to hundreds of years ago. Being invented by Thomas Edison in 1896, fluorescent lamps used calcium tungstate as the substance to fluoresce then. In 1939, they were firstly introduced to the market as commercial products with variety of types.

In a fluorescent lamp tube, there is a mix of mercury vapor, xenon, argon, and neon, or krypton. A fluorescent coating coats on the inner wall of the lamp. The fluorescent coating is made of blends of rare-earth phosphor and metallic salts. Normally, the electrodes of the lamp comprise coiled tungsten. The electrodes are also coated with strontium, calcium oxides and barium. An internal opaque reflector can be found in some fluorescent lamps. Normally, the shape of the light tubes is straight. Sometimes, the light tubes are made circle for special usages. Also, u-shaped tubes are seen to provide light for more compact areas.

Because there is mercury in fluorescent lamps, it is likely that the mercury contaminates the environment after the lamps are broken. Electromagnetic ballasts in fluorescent lamps are capable of producing buzzing mouse. Radio frequency interference is likely to be made by old fluorescent lamps. The operation of fluorescent lamps requires specific temperature, which is best around room temperature. If the lamps are placed in places with too low or high temperature, the efficacy of the lamps decreases.

In real lighting device design, details are critical no matter how small they appear. For example, to fix two components together conveniently usually brings large technical effect in the field of light device particularly when any such design involves a very large number of products to be sold around the world.

SUMMARY

In some embodiments, a light tube apparatus includes a tubular housing, a LED module, an EMI circuit, a rectifier circuit, a filter circuit, a conversion circuit, a safety circuit, and a PWM modulation circuit.

The LED module is enclosed by the tubular housing and emitting a light passing through the tubular housing.

The EMI circuit is used for anti-interference of an alternating current signal from a power source. The rectifier circuit is connected with the EMI circuit for rectifying the alternating current signal to generate a direct current signal. The filter circuit is used for filtering the direct current signal.

The conversion circuit is used for converting a voltage of the direct current signal to drive the LED module. The safety circuit is connected to a dimming signal from a dimmer for preventing an incorrect connection when the dimmer is connected in wrong direction causing loop breakage.

The PWM modulation circuit connected to the conversion circuit and the safety circuit for performing a pulse width modulation for the dimming signal supplied to the conversion circuit for adjusting a luminance level of the LED module.

In some embodiments, the EMI circuit includes a first inductor col, a second inductor coil and a voltage sensitive resistor, a first end of the voltage sensitive resistor and a first stage input of the first inductor coil are connected to a positive terminal of the power source, a second end of the voltage sensitive resistor and a second stage input of the first inductor coil are connected to a negative terminal of the power source, a first stage output of the first inductor is connected to a first stage input of the second inductor coil, a first stage output of the second inductor coil and a second stage output of the second inductor coil are used as output ends of the EMI circuit.

In some embodiments, the rectifier circuit includes a rectifier bridge.

In some embodiments, the filter circuit includes a second capacitor, a third resistor and a third inductor, a first end of the second capacitor and a first end of the third resistor are connected to a first end of the third inductor as an input of the filter circuit, a second end of the second capacitor is grounded, a second end of the third resistor is connected to a second end of the third inductor as an output of the filter circuit.

In some embodiments, the PWM modulation circuit includes a PWM chip, an optical coupler, a third Zener diode, a sixth diode, a twenty-eighth resistor, a first divider resistor, a second divider resistor, a third divider resistor, a fourth divider resistor, a fifth divider resistor, a sixth divider resistor, a seventh divider resistor, a first filter capacitor, a second filter capacitor, a third filter capacitor and a fourth filter capacitor, wherein an input of a light source of the optical coupler is connected to a negative end of the third Zener diode and a first end of the twenty-eighth resistor used as an input of the PWM modulation circuit, an output of a light source of optical coupler and a positive end of the third Zener diode are grounded, a second end of the twenty-eighth resistor is connected to a negative end of the sixth diode, a positive end of the sixth diode is connected to a reference voltage, an input end of a light receiver of the optical coupler is connected to a first end of the sixth divider resistor, a second end of the sixth divider resistor is connected to a first serial port of the PWM chip, a first end of the first divider resistor and a first end of the seventh divider resistor are connected to a management end of the PWM chip, a second end of the first divider resistor is connected to a first end of the second divider resistor, a first end of the fourth filter capacitor is connected to a comparison end of the PMW chip, a first end of the first filter capacitor is connected to voltage regulator end of the PWM chip, a second end of the seventh divider resistor and a first end of the third divider resistor are connected to an empty end of the PMW chip a first end of the fourth divider resistor and a first end of the second filter capacitor are connected to an input end of the PWM chip, a first end of the fifth divider resistor and a first end of the third filter capacitor are connected to a second serial port of the PWM chip, a second end of the fifth divider resistor is used as an output end of the PMW chip, a second end of the fourth filter capacitor, a second end of the second divider resistor, a second end of the first filter capacitor, a second end of the third divider resistor, a second end of the second filter capacitor and a second end of the third filter capacitor are grounded In some embodiments, the safety circuit includes a tenth diode, a transient voltage suppressor diode and a thermal resistor, a positive terminal of the tenth diode is used as an input of the safety circuit, a negative terminal of the tenth diode is connected to a first end of the transient voltage suppressor diode and a first end of the thermal resistor, a second end of the thermal resistor is used as an output of the safety circuit, a second end of the transient voltage suppressor diode is grounded.

In some embodiments, the light tube apparatus may also include a first end cap and a second end cap, wherein the EMI circuit, the rectifier circuit, the filter circuit and the safety circuit are placed in at least one of the first end cap and the second end cap, the first end cap and the second end cap are disposed at two opposite ends of the tubular housing.

In some embodiments, the light tube apparatus may also include a second power circuit and a power terminal, wherein the first end cap and the second end cap are detachably removable, when the first end cap and the second end cap are removed from the tubular housing, the second power circuit supplies electricity to the LED module.

In some embodiments, the power terminal receives a direct current source.

In some embodiments, the power terminal is connected to another light tube apparatus for receiving the direct current source.

In some embodiments, the power terminal also receives a control command from the another light tube, the second power circuit controls the LED module according to the control command.

In some embodiments, the second power circuit converts a alternating current to a direct current to drive the light source module.

In some embodiments, the light tube apparatus may also include a wireless circuit connected to the safety circuit and the conversion circuit, the wireless circuit is disconnected from the conversion circuit unless the safety circuit indicates a correct connection is done.

In some embodiments, the safety circuit includes a timer for waiting a predetermined time period before indicating the correct connection is done.

In some embodiments, the safety circuit executes a test operation for a predetermined time period before enabling the conversion circuit.

In some embodiments, the safety circuit triggers an alarm message to inform users the incorrect connection.

In some embodiments, the safety circuit sends the alarm message transmitted to a speaker to inform the users.

In some embodiments, the safety circuit shows the alarm message with an indicator.

In some embodiments, the indicator is a LED chip of the LED module.

In some embodiments, the safety circuit is connected to a fuse to turn off the conversion circuit.

DETAILED DESCRIPTION

Some standard LED light tubes need to be connected under regular indoor power source to work normally. If DIM+, DIM− of dimming ends of low voltage are connected to L, N lines of high voltage alternating current, LED light tubes are damaged and fail to work normally.

In the following embodiments, a LED light tube has circuits for performing following processing on an alternating current signal form a power source. Anti-interference, rectifying, filtering, voltage conversion and pulse width modulation are handled before a direct current is supplied to drive a LED light source. When a dimmer is incorrectly connected, a safety circuit breaks the loop for protecting the LED light tube. Therefore, when the connection is corrected, the LED light tube is able to function normally, instead of being damaged and fail to work.

Figure 1:
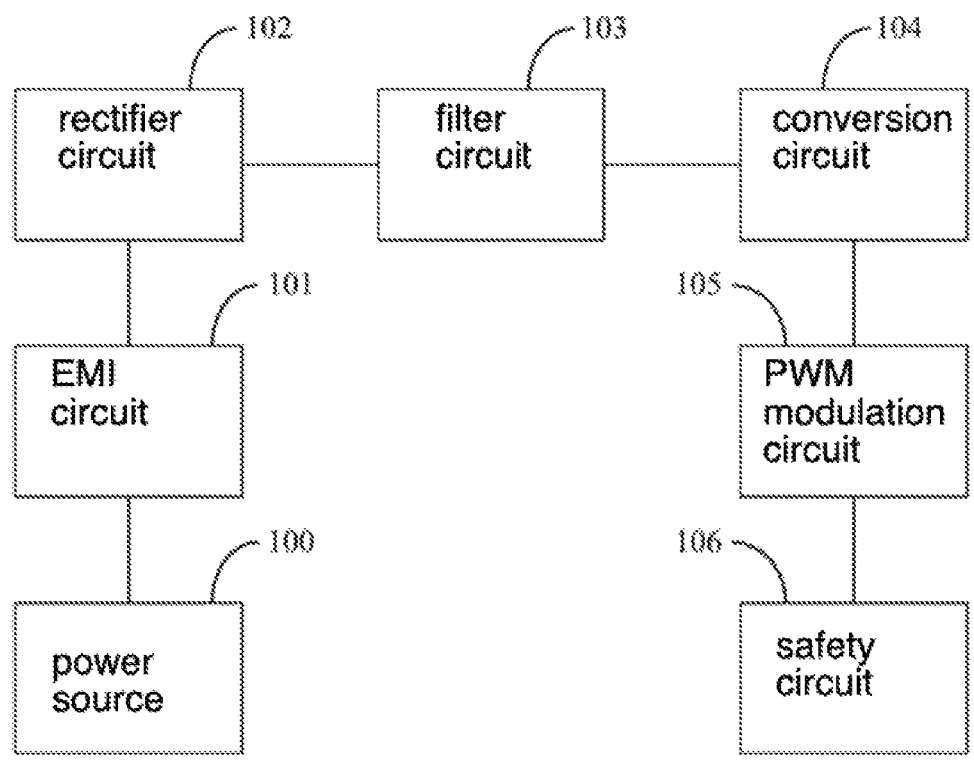
FIG. 1 illustrates a structure diagram of an embodiment.

FIG. 1 shows a structure diagram showing an embodiment with misconnection prevention.

The LED light tube includes an EMI (Electro-Magnetic Interference) circuit 101, a rectifying circuit 102, a filtering circuit 103, a conversion circuit 104, a PWM modulation circuit 105 and a safety circuit 106.

The EMI circuit 101 is connected to a power source 100 for anti-interference processing to an alternating current signal from the power source 100.

The rectifying circuit 102 is connected to the EMI circuit 101 for rectifying the alternating current signal for generating a direct current signal.

The filter circuit 103 is connected to the rectifying circuit 102 for filtering the direct current signal.

The conversion circuit 104 is connected to the filter circuit 103 for voltage conversion on the filtered direct current signal.

The safety circuit 106 is used for receiving a dimming signal from a dimmer and causes a loop breakage to shut down the electric loop.

The PWM modulation circuit 105 is connected to the conversion circuit 104 and the safety circuit 106 for pulse modulation on the dimming signal supplied to the conversion circuit 104 to adjust a luminance level of the LED light source.

Figure 2:
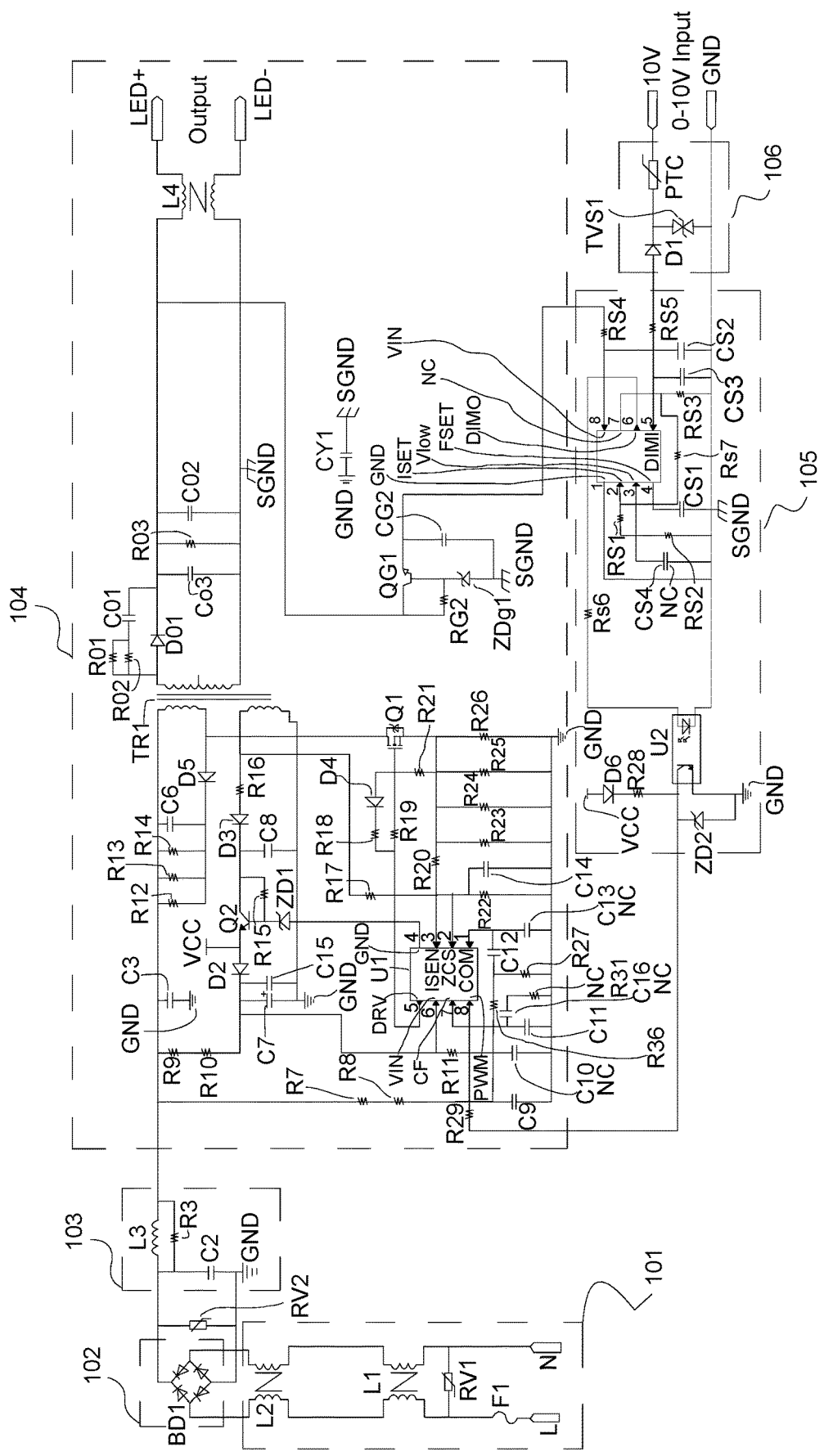
FIG. 2 illustrates a circuit diagram example for an embodiment.

FIG. 2 shows an exemplary circuit with safety design. For brevity, only portions related to the embodiments related to claimed inventions The EMI circuit 101 includes a first inductor coil L1, a second inductor coil L2 and a voltage sensitive resistor RV1.

A first end of the voltage sensitive resistor RV1 and a first stage input of the first inductor coil L1 are connected to a positive end of the power source.

A second end of the voltage sensitive resistor RV1 and a second stage input of the first inductor coil L1 are connected to a negative end of the power source.

The first stage output of the first inductor coil L1 is connected a first stage input of the second inductor coil L2. The second stage output of the first inductor coil L1 is connected to a second stage input of the second inductor coil L2. The first stage output of the second inductor coil L2 and the second stage output of the second inductor coil L2 are used as an output end of the EMI circuit 101.

In some embodiments, the rectifying circuit 102 includes rectifying bridge BD1.

In some embodiments, the filtering circuit 103 includes a second capacitor C2, a third resistor R3 and a third inductor L3.

A first end of the second capacitor C2, a first end of the third resistor and a first end of the third inductor L3 are connected as an input of the filter circuit 103. The A second end of the second capacitor C2 is grounded. A second end of the third resistor R3 is connected to a second end of the third inductor L3 as an output of the filter circuit 103.

In some embodiments, the conversion circuit 104 includes a transformer TR1, a transformer chip U1, a fourth inductor coil L4, a first transistor Q1, a second transistor Q2, a third transistor QG1, a first Zener diode ZD1, a second Zener diode ZDg1, a first diode D01, a second diode D2, a third diode D3, a fourth diode D4, a fifth diode D5, a first energy saving capacitor C01, a second energy saving capacitor C02, a third energy saving capacitor C03, a fourth energy saving capacitor C03, a fourth energy saving capacitor CG2, a third capacitor C3, a sixth capacitor C6, a seventh capacitor C7, an eighth capacitor C8, a ninth capacitor C9, a tenth capacitor C10, an eleventh capacitor C11, a twelfth capacitor C12, a thirteen capacitor C13, a fourteenth capacitor C14, a fifteenth capacitor C15, a current limit resistor R01, a second current limit resistor R02, a third current limit resistor R03, a seventh resistor R7, an eighth resistor R08, a ninth resistor R9, a tenth resistor R10, an eleven resistor R11, a twelfth resistor R12, a thirteenth resistor R13, a fourteenth resistor R14, a fifteenth resistor R15, a sixteenth resistor R16, a seventeenth resistor R17, an eighteenth resistor R18, a nineteenth resistor R19, a twentieth resistor R20, a twenty-first resistor R21, a twenty-second resistor R22, a twenty-third resistor R23, a twenty-fourth resistor R24, a twenty-fifth resistor R25, a twenty-sixth resistor R26, a twenty-seventh resistor R27, a twenty-ninth resistor R29, a thirty-first resistor R31, a thirty-sixth resistor R36 and a fourth current limit resistor RG2.

A first end of the seventh resistor R7, a first end of the ninth resistor R9, a first end of the third capacitor C3, a first end of the twelfth resistor R12, a first end of the thirteenth resistor R13, a first end of the fourteenth resistor R14 and a first end of the sixth capacitor C6 are connected together and are connected an input of a first stage coil of the transformer TR1, A second end of the ninth resistor R9 is connected to a first end of the tenth resistor R10. A second end of the tenth resistor R10, a first end of the eleventh resistor R11, a first end of the seventh capacitor C7, a first end of the fifteenth capacitor C15 and a negative end of the second diode D2 are connected together and are connected to an input end VIN of the transformer chip U1.

A positive end of the second diode D2 is connected to an output end of the second transistor Q2. A control end of the second transistor Q2 is connected to a first end of the fifth resistor R15 and a negative end of the Zener diode ZD1.

An input end of the second transistor Q2, a second end of the fifth resistor R15, a first end of the eighth capacitor C8 and a negative end of the third diode D3 are connected. A positive end of the third diode D3 is connected to a first end of the sixteenth resistor R16.

A second end of the sixteenth resistor R16 is connected to a first end of the seventeenth resistor R17. A second end of the twelfth resistor R12, a second end of the thirteenth resistor R13, a second end of the fourteenth resistor R14, a second end of the sixth capacitor C6 and a negative end of the fifth diode D5 are connected together.

A second end of the seventh capacitor C7, a second end of the fifteenth capacitor C15, a positive end of the first Zener diode ZD1, a second end of the eighth capacitor C8 and a second end of third capacitor C3 are grounded.

A positive end of the fifth diode D5 is connected to an output end of the first transistor Q1. The control end of the first transistor Q1, a positive end of the fourth diode D4, a first end of the nineteenth resistor R19 and a first end of the twenty-first resistor R21 are connected together.

A negative end of the fourth diode D4 is connected to a first end of the eighteenth resistor R18. A second end of the eighteenth resistor R18, a second end of the nineteenth resistor R19 and output DRV of the transformer chip U1 are connected together.

A second end of the seventeenth resistor R17, a first end of the twenty-second resistor R22 and a first end of the fourteenth capacitor C14 are connected together and are connected to a detection end ZCS of the transformer chip U1.

An input end of the first transistor Q1, a second end of the twenty-first resistor R21, a first end of the twentieth resistor R20, a first end of the twenty-third resistor R23, a first end of the twenty-fifth resistor R25 and a first end of the twenty-sixth resistor R26 are connected together. A second end of the eleventh resistor R11, a first end of the twenty-ninth resistor R29 and a first end of the tenth capacitor C10 and are connected to a PWM pulse input end of the transformer chip U1. A second end of the twenty-ninth resistor R29 is used as an output end of the conversion circuit. A second end of the seventh resistor R7 is connected to a first end of the eighth resistor R8.

A second end of the eighth resistor R8, a first end of the thirty-sixth resistor R36 and a first end of the ninth capacitor C9 are connected. A second end of the thirty-sixth resistor R36, a first end of the twelfth capacitor C12 and a first end of the twenty-seventh resistor R27 are connected together.

A second end of the twelfth capacitor C12, a second end of the thirteenth capacitor C13 and a serial port COM of the transformer chip U1 are connected. A first end of the eleventh capacitor C11, a first end of the sixth capacitor C16 and a feedback capacitor end CF of the transformer chip U1.

A second end of the sixteenth capacitor C16 is connected to a first end of the thirty-first resistor R31. A second end of the ninth capacitor C9, a second end of the tenth capacitor C10, a second end of the eleventh capacitor C11, a second end of the thirty-first resistor R31, a second end of the twenty-seventh resistor R27, a second end of the thirteenth capacitor C13, a second end of the twenty-second resistor R22, a second end of the fourteenth capacitor C14, a second end of the twenty-third resistor R23, a second end of the twenty-fourth resistor R24, a second end of the twenty-fifth resistor R25 and a second end of the twenty-sixth resistor R26 are grounded.

A first end of the first current limit resistor R01, a first end of the second current limit resistor R02 and a positive end of the first diode D01 are connected. A second end of the first current limit resistor R01, a second end of the second current limit resistor R02 and a first end of the first energy saving capacitor C01 are connected.

A second end of the first energy saving capacitor C01, a negative end of the first diode D01, a first end of the second energy saving capacitor C02, a first end of the third energy saving capacitor C03, a first end of the third current limit resistor R03, an input end of the third transistor QG1 and a first end of the fourth current limit resistor RG2 are connected and are connected to a first stage input of the fourth inductor coil L4.

A second end of the second energy saving capacitor C02, a second end of the third energy saving capacitor C03 and a second end of the third current limit resistor R03 are connected and are connected to a second stage end of the fourth inductor coil L4.

An output end of the third transistor QG1 is connected to a first end of the fourth energy saving capacitor CG2. A control end of the third transistor QG1 is connected to a second end of the fourth current limit resistor RG2 and a negative end of the second Zener diode ZDg1. A positive end of the second Zener diode ZDg1 and a second end of the fourth energy saving capacitor CG2 are grounded.

The first transistor Q1 may be a field effect transistor or a triode.

The gate terminal, drain terminal and the source terminal of the field effect transistor are the control end, the input end and the output end of the first transistor Q1.

The base terminal, collector terminal and emitter terminal of the triode are the control end, the input end and the output end of the first transistor Q1.

The second transistor Q2 includes a field effect transistor or a triode.

The gate terminal, drain terminal and the source terminal of the field effect transistor are the control end, the input end and the output end of the second transistor Q2.

The base terminal, collector terminal and emitter terminal of the triode are the control end, the input end and the output end of the second transistor Q2.

The third transistor Q3 includes a field effect transistor or a triode.

The gate terminal, drain terminal and the source terminal of the field effect transistor are the control end, the input end and the output end of the third transistor Q3.

The base terminal, collector terminal and emitter terminal of the triode are the control end, the input end and the output end of the third transistor Q3.

In some embodiments, the PWM modulation circuit 105 includes a pulse width modulation (PWM) chip US1, an optical coupler U2, a third Zener diode ZD2, a sixth diode D6, a twenty-eighth resistor R28, a first divider resistor RS1, a second divider resistor RS2, a third divider resistor RS3, a fourth divider resistor RS4, a fifth divider resistor RS5, a sixth divider resistor RS6, a seventh divider resistor RS7, a first filter capacitor CS1, a second filter capacitor CS2, a third filter capacitor CS3 and a fourth filter capacitor CS4.

An input end of the light source of the optical coupler U2, a negative end of the third Zener diode ZD2 and a first end of the twenty-eighth resistor R28 are connected and are used as an input end of the PWM modulation circuit 105.

An output end of a light source of the optical coupler U2 and a positive end of the third Zener diode are grounded. A second end of the twenty-eighth resistor R28 is connected to a negative end of the sixth diode D6. The positive end of the sixth diode D6 are connected to a reference voltage. An input of the receiver of the optical coupler U2 is connected to a first end of the sixth divider resistor RS6. A second end of the sixth divider resistor RS6 is connected to first serial portion DIM0 of the PWM chip US1. A first end of the first divider resistor RS1 and a first end of the seventh divider resistor RS7 are connected to a management end ISET of the PWM chip US1.

The second end of the first divider resistor RS1 is connected to a first end of the second divider resistor RS2. A first end of the fourth filter capacitor CS4 is connected to a comparison end Vlow of the PWM chip US1.

A first end of the first filter capacitor CS1 is connected to a Zender end FSET of the PWM chip US1. A second end of the seventh divider resistor RS7 and a first end of the third divider resistor RS3 are connected to an empty end NC of the PWM chip US1.

A first end of the fourth divider resistor RS4 and a first end of the second filter capacitor CS2 are connected to an input end VIN of the PWM chip US1.

The fourth divider voltage VIN, a first end of the fifth divider resistor RS5 and a first end of the third filter capacitor CS3 are connected to a second serial port DIM1 of the PWM chip US1. A second end of the fifth divider resistor RS5 is used as an output end of the PWM modulation circuit 105. A second end of the fourth filter capacitor CS4, a second end of the second divider resistor RS2, a second end of the first filter capacitor CS1, a second end of the third divider resistor RS3, a second of the second filter capacitor CS2 and a second end of the third filter capacitor CS 3 are grounded.

In some embodiments, the safety circuit 106 includes a twelfth diode D1, a transient voltage suppressor diode TVS1 and a thermal resistor PTC1.

A positive end of the twelfth diode D1 is an input end of the safety circuit 106. A negative end of the twelfth diode D1 and a first end of the transient voltage suppressor diode TVS1 are connected to a first end of the thermal resistor PTC1.

A second end of the thermal resistor PTC1 is an output end of the safety circuit 106. A second end of the transient voltage suppressor diode TVS1 is grounded.

Figure 3:
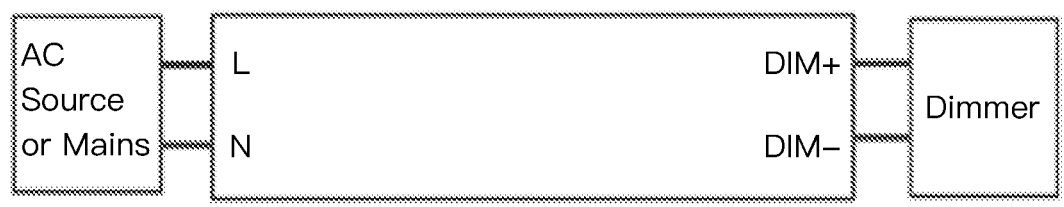
FIG. 3 illustrates a connection example.
Figure 4:
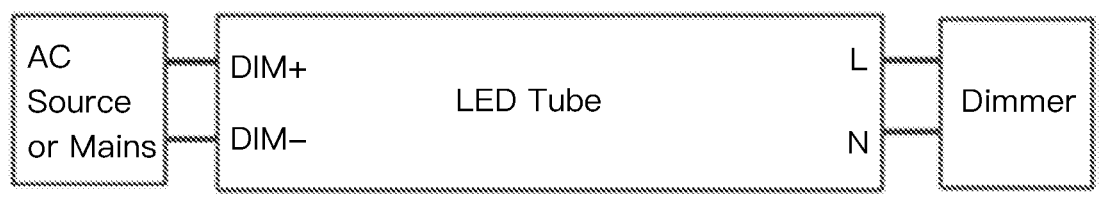
FIG. 4 illustrates another connection example.

FIG. 3 and FIG. 4 show a correct connection and an incorrect connection diagram for LED light tubes.

In some embodiments, when a user connects a dimmer as shown in FIG. 3, the LED light tube works normally and emits light.

When a user connects the dimmer as FIG. 4, the LED light tube does not emit light but the LED light tube is not damaged. When the user corrects the connection, the LED light tube works normally.

Please refer to FIG. 1 to FIG. 4. The operation of the circuit embodiments is explained as follows.

First, L end and N end of the power source are connected to two pins of one end of the LED light tube. Two pins are connected to an external power source like 110V or 220V alternating current source.

The EMI circuit 101 filters EMI interference. The rectifying circuit 102 then rectifies the power to get a rectified signal. The rectified current is then filtered by the filter circuit 103 to get a filtered signal. The filtered signal is converted by the conversion circuit 104 to generate a constant current supplying to the LED modules in the LED light tube.

The dimming ends DIM+ and DIM− are connected to two pins of the other end of the LED light tube connecting to an external dimmer for receiving a dimming signal of a dimmer. The dimming signal may be a voltage signal or a PWM signal.

The dimming signal first passes through the safety circuit 106, then to the PWM modulation circuit 105. The PWM modulation circuit 105 converts the dimming signal to a standard PWM signal supplying to the PWM end of the conversion circuit 104.

The transformer chip U1 recognizes the pulse width of the standard PWM signal and adjusts sampling of the internal current of the transformer chip U1 to control amount of the output current to adjust luminance level of the LED modules in the LED light tube.

The safety circuit 106 is connected in series between the PWM modulation circuit 105 and the dimming ends DIM+, DIM− to prevent low voltage DIM+, DIM− ends to be connected to L, N ends of high voltage while preventing the LED light tube not getting damaged.

Even the user makes mistake on connection for a while, when the connection is corrected, the LED light tube still works normally. The safety circuit 106 monitors voltage of the DIM+, DIM− ends. When a voltage in DIM+, DIM− ends is higher than a predetermined threshold, the voltage is lowered to safe voltage quickly to ensure that the PWM modulation circuit 105 not being damaged by high voltage.

When the DIM+, DIM− of low voltage are connected correctly, when the dimming signal of the ends has lower voltage than a clamping voltage of the TVS1, the TVS1 does not work. When the current of the dimming signal is lower than an operation current of the PTC!, the PTC1 is at low impedance and does not work. The dimming signal may be correctly detected by the PWM modulation circuit and the LED light tube is adjusted correctly for its luminance level.

When the DIM+, DIM− of low voltage are connected to L, N ends of high voltage, the high voltage signal passes through the positive temperature parameter fuse PTC1 and two-way transient voltage suppressor diode TVS1. Because the current passing through the PTC 1 is large, the PTC1 quickly increases its impedance when it is getting hotter quickly to limit current passing through the TVS1 so as to keep the TVS1 safe, not being damaged.

Meanwhile, the TVS may limit voltages at its two ends below 18V to ensure the DIMI end of the PWM chip US1 not being damaged, when usually DIMI voltage should not exceed 20V. The diode D1 is used for preventing the current back flowing to the DIMI end of the US1 to protect the end. When the user finds the incorrect connection, the user corrects the error and the LED light tube works normally.

The PWM modulation circuit 105 automatically recognizes the dimming signal at DIM+, DIM− ends. The dimming signal may be a voltage signal or a PWM signal. The PWM modulation circuit 105 converts different voltage or dimming signal with different duty radio to a standard PWM signal with different duty ratio.

The standard PWM signal is supplied to the PWM end of the conversion circuit 104. The transformer chip U1 of the conversion circuit 104 recognizes the duty ratio of the standard PWM signal to adjust sampling base voltage, i.e. the voltage of the U1ISEN end, for current inside the transformer chip U1 to control the output current and thus adjusts luminance level.

In summary, these embodiments provide a LED light tube apparatus with safety design for preventing incorrect connection damaging the LED light tube apparatus.

Figure 5A:
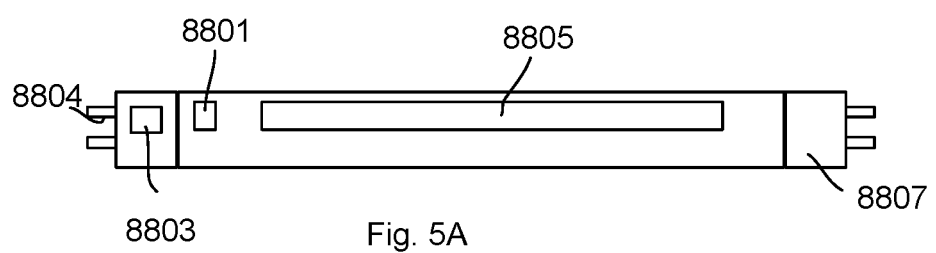
FIG. 5A and FIG. 5B shows another embodiment.
Figure 5B:
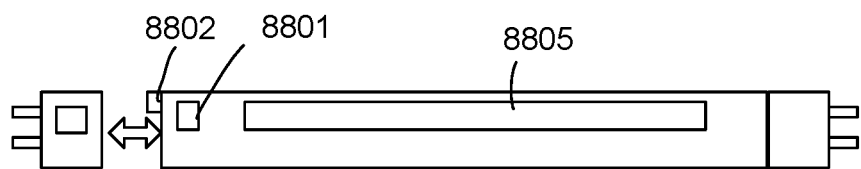

In FIG. 5A and FIG. 5B, the light tube apparatus may also include a first end cap 8804 and a second end cap 8807, wherein the EMI circuit, the rectifier circuit, the filter circuit and the safety circuit together as a module 8803 are placed in at least one of the first end cap 8804 and the second end cap 8807, the first end cap 8803 and the second end cap 8807 are disposed at two opposite ends of the tubular housing.

In FIG. 5A and FIG. 5B, the light tube apparatus may also include a second power circuit 8801 and a power terminal 8802, wherein the first end cap 8804 and the second end cap 8807 are detachably removable. When the first end cap 8804 and the second end cap 8807 are removed from the tubular housing, the second power circuit 8801 supplies electricity to the LED module 8805.

Figure 6:
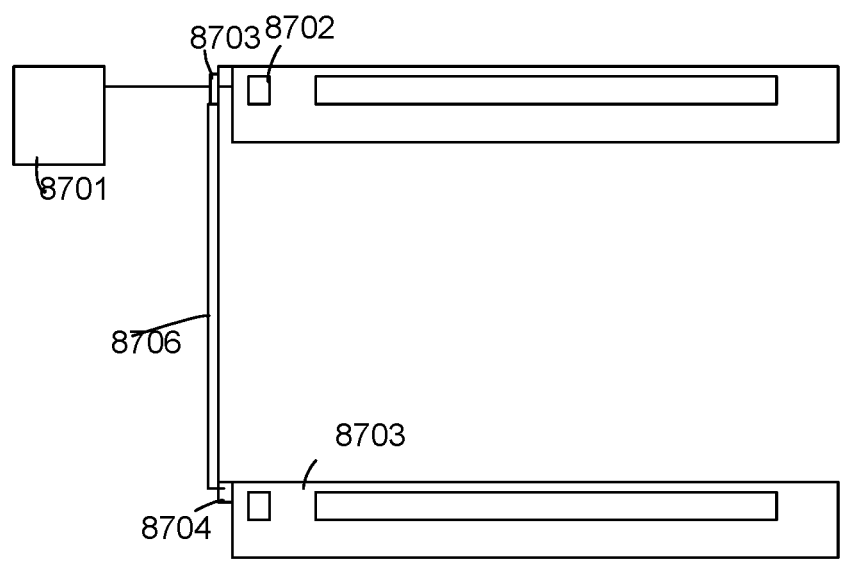
FIG. 6 illustrates another way to use the embodiment.

In FIG. 6, the power terminal 8703 receives a direct current source 8701. For example, when the LED light tube is to be installed in a bracket specifically designed for LED light tube, instead of a traditional light tube bracket, in which compatibility of multiple types of traditional light tubes need to be considered thus rendering unnecessary burden like blaster. In such case, the two end caps are removed, e.g. via screw structures or magnetic structures.

In FIG. 6, the power terminal 8704 of another light tube is connected to the light tube apparatus just explained for receiving the direct current source. In such design, such LED light tube may be connected in series and scalable on deploying such LED light tubes.

In FIG. 6, the power terminal also receives a control command 8706 from another light tube, the second power circuit controls the LED module according to the control command. In such design, the dimmer for controlling a first LED light tube may be shared to control a second LED light tube, simplifying control design.

In some embodiments, the second power circuit converts an alternating current to a direct current to drive the light source module.

Figure 7:
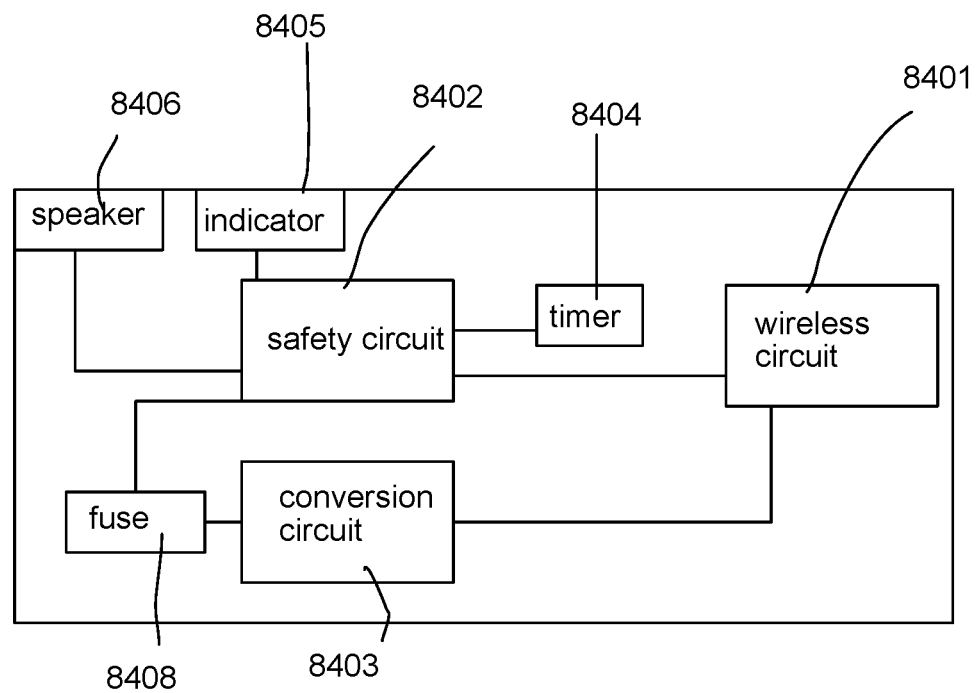
FIG. 7 illustrates another embodiment circuit diagram.

In FIG. 7, the light tube apparatus may also include a wireless circuit 8401 connected to the safety circuit 8402 and the conversion circuit 8403, the wireless circuit 8401 is disconnected from the conversion circuit 8403 unless the safety circuit 8402 indicates a correct connection is done.

In FIG. 7, the safety circuit 8402 includes a timer 8404 for waiting a predetermined time period before indicating the correct connection is done.

In some embodiments, the safety circuit executes a test operation for a predetermined time period before enabling the conversion circuit.

In some embodiments, the safety circuit triggers an alarm message to inform users the incorrect connection.

In FIG. 7, the safety circuit sends the alarm message transmitted to a speaker 8406 to inform the users.

In FIG. 7, the safety circuit shows the alarm message with an indicator 8405.

In some embodiments, the indicator is a LED chip of the LED module.

In FIG. 7, the safety circuit is connected to a fuse 8408 to turn off the conversion circuit 8403.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A light tube apparatus comprising:
   a tubular housing;
   a LED module, enclosed by the tubular housing and emitting a light passing through the tubular housing;
   an EMI circuit for anti-interference of an alternating current signal from a power source;
   a rectifier circuit connected with the EMI circuit for rectifying the alternating current signal to generate a direct current signal;
   a filter circuit for filtering the direct current signal;
   a conversion circuit for converting a voltage of the direct current signal to drive the LED module;
   a safety circuit connected to a dimming signal from a dimmer for preventing an incorrect connection when the dimmer is connected in wrong direction causing loop breakage; and
   a PWM modulation circuit connected to the conversion circuit and the safety circuit for performing a pulse width modulation for the dimming signal supplied to the conversion circuit for adjusting a luminance level of the LED module, wherein the safety circuit comprises a tenth diode, a transient voltage suppressor diode and a thermal resistor, a positive terminal of the tenth diode is used as an input of the safety circuit, a negative terminal of the tenth diode is connected to a first end of the transient voltage suppressor diode and a first end of the thermal resistor, a second end of the thermal resistor is used as an output of the safety circuit, a second end of the transient voltage suppressor diode is grounded.

2. The light tube apparatus of claim 1, wherein the EMI circuit comprises a first inductor coil, a second inductor coil and a voltage sensitive resistor, a first end of the voltage sensitive resistor and a first stage input of the first inductor coil are connected to a positive terminal of the power source, a second end of the voltage sensitive resistor and a second stage input of the first inductor coil are connected to a negative terminal of the power source, a first stage output of the first inductor coil is connected to a first stage input of the second inductor coil, a first stage output of the second inductor coil and a second stage output of the second inductor coil are used as output ends of the EMI circuit.

3. The light tube apparatus of claim 1, wherein the rectifier circuit comprises a rectifier bridge.

4. The light tube apparatus of claim 1, wherein the filter circuit comprises a second capacitor, a third resistor and a third inductor, a first end of the second capacitor and a first end of the third resistor are connected to a first end of the third inductor as an input of the filter circuit, a second end of the second capacitor is grounded, a second end of the third resistor is connected to a second end of the third inductor as an output of the filter circuit.

5. The light tube apparatus of claim 1, wherein the PWM modulation circuit comprises a PWM chip, an optical coupler, a third Zener diode, a sixth diode, a twenty-eighth resistor, a first divider resistor, a second divider resistor, a third divider resistor, a fourth divider resistor, a fifth divider resistor, a sixth divider resistor, a seventh divider resistor, a first filter capacitor, a second filter capacitor, a third filter capacitor and a fourth filter capacitor, wherein an input of a light source of the optical coupler is connected to a negative end of the third Zener diode and a first end of the twenty-eighth resistor used as an input of the PWM modulation circuit, an output of a light source of optical coupler and a positive end of the third Zener diode are grounded, a second end of the twenty-eighth resistor is connected to a negative end of the sixth diode, a positive end of the sixth diode is connected to a reference voltage, an input end of a light receiver of the optical coupler is connected to a first end of the sixth divider resistor, a second end of the sixth divider resistor is connected to a first serial port of the PWM chip, a first end of the first divider resistor and a first end of the seventh divider resistor are connected to a management end of the PWM chip, a second end of the first divider resistor is connected to a first end of the second divider resistor, a first end of the fourth filter capacitor is connected to a comparison end of the PMW chip, a first end of the first filter capacitor is connected to voltage regulator end of the PWM chip, a second end of the seventh divider resistor and a first end of the third divider resistor are connected to an empty end of the PMW chip a first end of the fourth divider resistor and a first end of the second filter capacitor are connected to an input end of the PWM chip, a first end of the fifth divider resistor and a first end of the third filter capacitor are connected to a second serial port of the PWM chip, a second end of the fifth divider resistor is used as an output end of the PMW chip, a second end of the fourth filter capacitor, a second end of the second divider resistor, a second end of the first filter capacitor, a second end of the third divider resistor, a second end of the second filter capacitor and a second end of the third filter capacitor are grounded.

6. The light tube apparatus of claim 1, further comprising a first end cap and a second end cap, wherein the EMI circuit, the rectifier circuit, the filter circuit and the safety circuit are placed in at least one of the first end cap and the second end cap, the first end cap and the second end cap are disposed at two opposite ends of the tubular housing.

7. The light tube apparatus of claim 1, further comprising a second power circuit and a power terminal, wherein the first end cap and the second end cap are detachably removable, when the first end cap and the second end cap are removed from the tubular housing, the second power circuit supplies electricity to the LED module.

8. The light tube apparatus of claim 7, wherein the power terminal receives a direct current source.

9. The light tube apparatus of claim 8, wherein the power terminal is connected to another light tube apparatus for receiving the direct current source.

10. The light tube apparatus of claim 9, wherein the power terminal also receives a control command from the another light tube, the second power circuit controls the LED module according to the control command.

11. The light tube apparatus of claim 7, wherein the second power circuit converts an alternating current to a direct current to drive the light source module.

12. The light tube apparatus of claim 1, further comprising a wireless circuit connected to the safety circuit and the conversion circuit, the wireless circuit is disconnected from the conversion circuit unless the safety circuit indicates a correct connection is done.

13. The light tube apparatus of claim 12, wherein the safety circuit comprises a timer for waiting a predetermined time period before indicating the correct connection is done.

14. The light tube apparatus of claim 1, wherein the safety circuit executes a test operation for a predetermined time period before enabling the conversion circuit.

15. The light tube apparatus of claim 1, wherein the safety circuit triggers an alarm message to inform users the incorrect connection.

16. The light tube apparatus of claim 15, wherein the safety circuit sends the alarm message transmitted to a speaker to inform the users.

17. The light tube apparatus of claim 15, wherein the safety circuit shows the alarm message with an indicator.

18. The light tube apparatus of claim 17, wherein the indicator is a LED chip of the LED module.

19. The light tube apparatus of claim 1, wherein the safety circuit is connected to a fuse to turn off the conversion circuit.

* * * * *